US012812740B2

(12) United States Patent
Huang et al.

(10) Patent No.: US 12,812,740 B2
(45) Date of Patent: Nov. 24, 2026

(54) TRANSPARENT LCD SOLUTION FOR MICROWAVE OVEN

(71) Applicant: WHIRLPOOL CORPORATION, Benton Harbor, MI (US)

(72) Inventors: Vince Huang, Shenzhen (CN); Xishuo Qiu, Shenzhen (CN); Ping Wu, Shenzhen (CN); Wenhao Xie, Foshan (CN); Song Zhao, Shenzhen (CN); Jianling Zhong, Foshan (CN)

(73) Assignee: Whirlpool Corporation, Benton Harbor, MI (US)

( * ) Notice: Subject to any disclaimer, the term of this patent is extended or adjusted under 35 U.S.C. 154(b) by 1109 days.

(21) Appl. No.: 17/299,947

(22) PCT Filed: Dec. 28, 2018

(86) PCT No.: PCT/CN2018/124995
§ 371 (c)(1),
(2) Date: Jun. 4, 2021

(87) PCT Pub. No.: WO2020/133251
PCT Pub. Date: Jul. 2, 2020

(65) Prior Publication Data

US 2022/0030676 A1 Jan. 27, 2022

(51) Int. Cl.
*H05B 6/64* (2006.01)
*H05B 6/76* (2006.01)

(52) U.S. Cl.
CPC ........... *H05B 6/6435* (2013.01); *H05B 6/766* (2013.01)

(58) Field of Classification Search
CPC .... H05B 6/6435; H05B 6/766; H05B 6/6414; H05B 6/763
USPC .......................................................... 219/720
See application file for complete search history.

(56) References Cited

U.S. PATENT DOCUMENTS 2,958,754 A * 11/1960 Hahn .................. H05K 9/0015 174/382
3,430,023 A * 2/1969 Tingley ............... H05B 6/6414 219/757
3,843,859 A * 10/1974 Klemp .................. H05B 6/766 219/740
4,008,383 A * 2/1977 Tanaka .................. H05B 6/763 219/743

(Continued)

FOREIGN PATENT DOCUMENTS

CN 102123534 A 7/2011
CN 203431951 * 2/2014

(Continued)

*Primary Examiner* — Woody A Lee, Jr.
(74) *Attorney, Agent, or Firm* — Price Heneveld LLP

(57) ABSTRACT

A door for a microwave oven is provided. The door (34) include a door frame (44) having a first side and a second side, an outer glass (40) coupled with the first side of the door frame (44), and a glass assembly (52) coupled with the second side of the door frame (44). The glass assembly (52) includes a first substantially transparent glass substrate (70), a second substantially transparent glass substrate (72), and an electrically conductive mesh layer (74) between the first and second substantially transparent glass substrates (70, 72). The mesh layer (74) includes a plurality of wires having a diameter less than 0.04 mm, The shielding performance of the door (34) is improved.

20 Claims, 5 Drawing Sheets

(56) References Cited

U.S. PATENT DOCUMENTS

| | | | | | |
|---|---|---|---|---|---|
| 4,211,910 | A * | 7/1980 | Kusunoki | H05B 6/766 219/742 |
| 5,981,927 | A | 11/1999 | Osepchuk et al. | |
| 7,053,348 | B1 * | 5/2006 | Terada | H05B 6/763 219/739 |
| 8,102,478 | B2 | 1/2012 | Xue | |
| 8,908,267 | B2 | 12/2014 | McCarthy et al. | |
| 10,986,703 | B2 * | 4/2021 | Imai | H05B 6/6441 |
| 11,140,754 | B2 * | 10/2021 | Lim | H05B 6/6494 |
| 11,246,792 | B2 * | 2/2022 | Held | A61H 15/00 |
| 11,716,793 | B2 * | 8/2023 | Connors | H05B 6/6402 219/756 |
| 11,866,982 | B2 * | 1/2024 | Tanaka | F24C 15/02 |
| 2003/0168447 | A1 * | 9/2003 | Lee | H05B 6/6414 219/722 |
| 2006/0138127 | A1 | 6/2006 | Kawashima et al. | |
| 2011/0205650 | A1 | 8/2011 | Powers et al. | |
| 2017/0099988 | A1 * | 4/2017 | Matloubian | A47J 37/0664 |
| 2018/0054860 | A1 * | 2/2018 | Kim | B23P 19/00 |
| 2018/0066131 | A1 * | 3/2018 | Jin | B82Y 30/00 |

FOREIGN PATENT DOCUMENTS

| | | | | |
|---|---|---|---|---|
| CN | 203431951 | U | | 2/2014 |
| CN | 105042654 | A | | 11/2015 |
| CN | 204987134 | | * | 1/2016 |
| CN | 204987134 | U | | 1/2016 |
| CN | 107667259 | A | | 2/2018 |
| CN | 207201221 | U | | 4/2018 |
| DE | 3714122 | | * | 10/1988 |
| DE | 20221618 | | * | 8/2006 |
| DE | 20221618 | U1 | | 8/2006 |
| DE | 202008010620 | | * | 11/2008 |
| EP | 1372369 | A1 | | 12/2003 |
| GB | 2025732 | | * | 1/1980 |
| GB | 2125732 | | * | 3/1984 |
| GB | 2125732 | A | | 3/1984 |
| GB | 2546122 | | * | 7/2017 |
| GB | 2546122 | A | | 7/2017 |
| JP | H08204382 | A | | 8/1996 |
| KR | 20020036508 | A | | 5/2002 |
| KR | 1020140014430 | | * | 2/2014 |
| KR | 101678217 | B1 | | 11/2016 |
| WO | 2018133021 | A1 | | 7/2018 |

* cited by examiner

TRANSPARENT LCD SOLUTION FOR MICROWAVE OVEN

TECHNOLOGICAL FIELD

Microwave ovens, and other appliances that rely on microwave radiation, operate to cook and heat foods by exploiting the interaction between microwaves and various molecules within the food. These high energy waves penetrate into the food, causing its water molecules to vibrate and generate heat within the food to cook it quickly, at least as compared to other cooking devices (e.g., ovens that rely on resistance heating). Typically, microwave ovens employ microwave energy at a frequency of about 2.45 GHz, with a wavelength of about 12 cm and a corresponding quantum energy of about $1\times10^{-5}$ eV. Standards, such as set by the Food and Drug Administration (FDA), limit the amount of microwave radiation that can leak from an oven throughout its lifetime. Consequently, the door of a microwave oven must limit the transmission of microwave radiation from the enclosed cavity to the surrounding environment.

SUMMARY

In at least one aspect, the present disclosure provides a door for a microwave oven including a door frame having a first side and a second side, an outer glass coupled with the first side of the door frame, and a glass assembly coupled with the second side of the door frame. The glass assembly can include a first substantially transparent glass substrate, a second substantially transparent glass substrate, and an electrically conductive mesh layer between the first and second substantially transparent glass substrates. The mesh layer can include a plurality of wires having a diameter less than 0.04 mm.

In at least another aspect, the present disclosure provides a door for a microwave oven including a door frame having a first side and a second side, an outer glass including a substantially transparent LCD coupled with the first side of the door frame, and a laminated glass assembly coupled with the second side of the door frame. The glass assembly can include a first substantially transparent glass substrate, a second substantially transparent glass substrate, and an electrically conductive mesh layer between the first and second substantially transparent glass substrates. The mesh layer can include a plurality of woven wires having a diameter less than 0.04 mm.

These and other features, advantages, and objects of the present device will be further understood and appreciated by those skilled in the art upon studying the following specification, claims, and appended drawings.

DETAILED DESCRIPTION OF EMBODIMENTS

Figure 1:
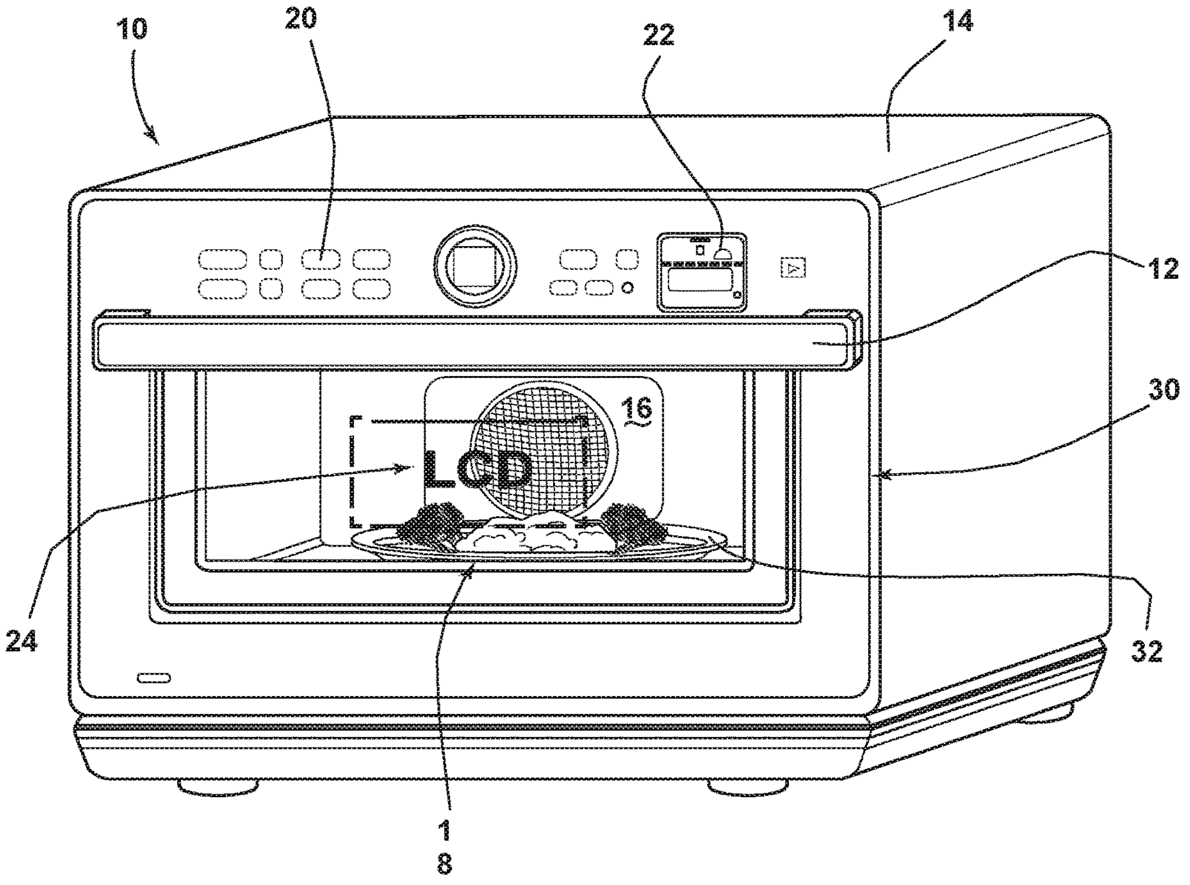
FIG. 1 is a schematic, perspective view of a microwave oven with a transparent door according to various aspects described herein.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a microwave oven 10 with a door assembly 30 is depicted in exemplary form according to various aspects described herein. The microwave oven 10 may include a cabinet 14 defining a cooking cavity, or interior 16 in which food 18 may be placed for cooking by microwave radiation. The cabinet 14 may be generally shaped as a rectangular prism defined by a plurality of enclosing surfaces, but is not limited to such a configuration. The cabinet 14 can be constructed of convention materials suitable for use in the cabinet of an appliance that generates microwave radiation (e.g. metals, metal alloys, polymeric materials, and composites of these materials) including one or more metal layers, films, or similar structures configured for shielding the radiation from reaching the exterior of the cabinet 14.

The opening to the interior 16 can be selectively covered by the door assembly 30. A handle 12 may be provided on the door assembly 30 to facilitate the selective opening and closing of the door assembly 30 by a user. However, the door assembly 30 can be movably coupled to the cabinet 14 in various configurations. Furthermore, the door assembly 30 can include a door glass assembly 32 having a liquid crystal display (LCD) 24. The door glass assembly 32 including the LCD 24 can be substantially transparent such that a user can view the interior 16. Substantially transparent can be characterized by a light transmissivity in the visible spectrum (about 400 to 800 nm) of at least 70%, and approximately 85%. Additionally, the microwave oven 10 may be provided with a user interface that includes one or more input elements 20, such as push buttons, touch switches, and knobs, etc. for setting operation parameters for controlling the microwave oven 10. The user interface may include one or more display elements 22 for displaying information to a user. While shown as distinct elements in FIG. 1, the input elements 20 and the display elements 22 may spatially overlap depending on the implementation of the user interface.

Figure 2:
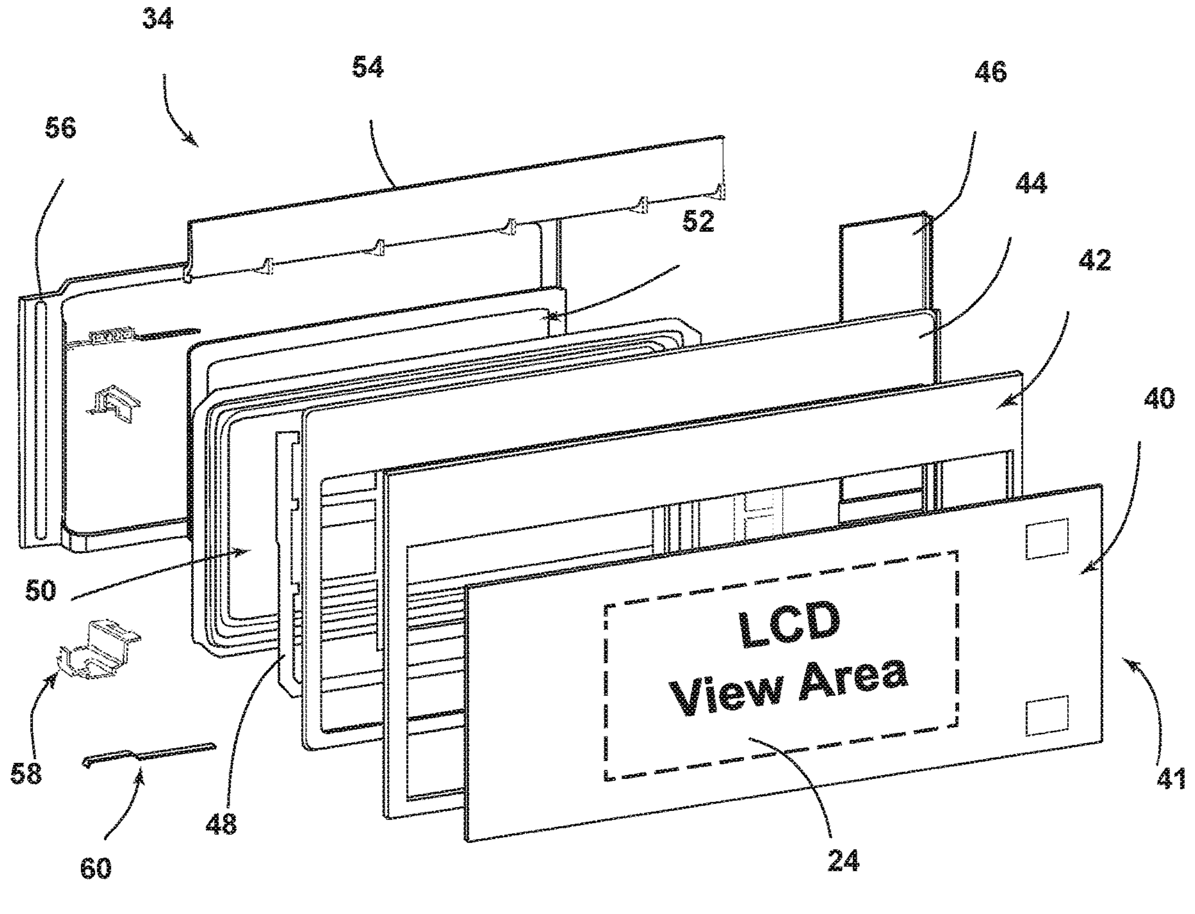
FIG. 2 is an exploded view of a transparent door assembly according to various aspects described herein.

Turning to FIG. 2, an exploded view of a door assembly 34 is illustrated. The door assembly 34 can be similar to the door assembly 30, with one difference being that the door assembly 34 is configured to include a pocket handle 46 located at a side, such as side 41, rather than a handle 12 (FIG. 1). In some examples, the door assembly 34 can be movably attached to the cabinet 14 (FIG. 1) with at least one hinge assembly. The hinge assembly can include a cavity hinge 58 and a door hinge 60. In some examples, the cavity hinge 58 can be riveted or welded with the interior 16, or cavity, while the door hinge 60 can be riveted or welded with a first side of a metal door plate 50. The door hinge 60 can be coupled with the metal door plate 50 with a rotating shaft on a second side of the metal door plate 50. The cavity hinge 58 and the door hinge 60 may be coupled via a rotating shaft in order to open and close the door assembly 34.

The door assembly 34 can include an outer glass 40 having the LCD 24 which can be arranged within an outer cladding 42. The outer cladding 42 may be in the form of a protective layer attached to a first side of an outer door frame 44 and may be at least partially transparent. The outer door frame 44 may be formed from a metal or comprise a metal structure. A decoration plate 54 may be disposed behind the top of the outer cladding 42 and may include a decoration corresponding with the display elements 22 or input elements 20 (FIG. 1) such that a user can view icons or symbols on the decoration plate 54 through the outer cladding 42. A steam protection plate 48 may be coupled with a second side of the outer door frame 44.

The door assembly 34 may further include the metal door plate 50 coupled with an inner frame 56. A glass assembly 52 can be positioned between the metal door plate 50 and the inner frame 56. The steam protection plate 48 may be disposed on a first side of the metal door plate 50 while the glass assembly 52 may be disposed on a second side of the metal door plate 50. Therefore, the outer glass 40 can be located adjacent the first side of the outer door frame 44 while the glass assembly 52 can be located adjacent the second side of the outer door frame 44.

Figure 3:
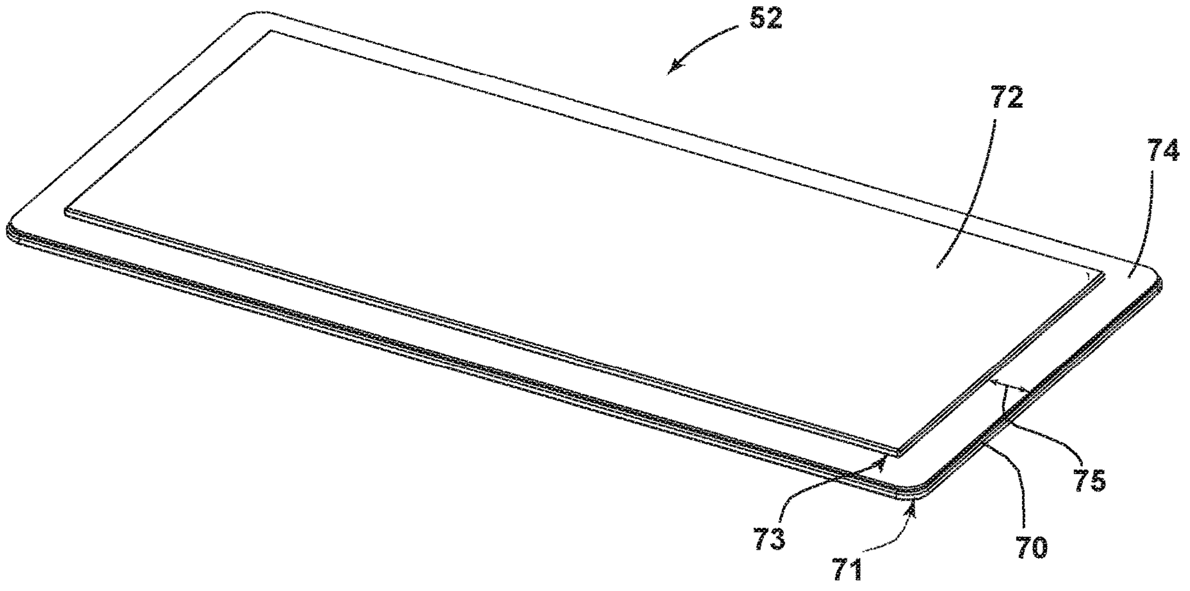
FIG. 3 is a perspective view of a glass assembly according to various aspects described herein.

FIG. 3 illustrates a perspective view of the glass assembly 52. The glass assembly 52 can be configured to shield microwave radiation from the interior 16 (FIG. 1) and may include a first substantially transparent substrate 70, a second substantially transparent substrate 72, and a mesh layer 74. The first and second substrates 70, 72 may comprise tempered glass plates. The mesh layer 74 may comprise an electrically conductive mesh which can include, but is not limited to, stainless steel. In some examples, the first substrate 70 includes a generally rectangular shape having rounded corners 71, and the second substrate 72 includes a generally rectangular shape having right angled-corners 73. However, the first and second substrates 70, 72 are not limited to these configurations.

The area of the second substrate 72 may be less than the area of the first substrate 70 and the mesh layer 74. The first substrate 70 and the mesh layer 74 may have similar dimensions. For example, the first substrate 70 may include a width of approximately 170 millimeters (mm) and a length of approximately 355 mm, while the mesh layer may include a width of approximately 168 mm and a length of approximately 353 mm. The second substrate 72 may include a width of approximately 138 mm and a length of approximately 323 mm such that the second substrate has an area less than each of the first substrate 70 and the mesh layer 74.

The glass assembly 52 may be configured as a composite assembly. For example, the first substrate 70, the second substrate 72, and the mesh layer 74 may be laminated wherein the mesh layer 74 is positioned in between the first and second substrates 70, 72. As illustrated in FIG. 3, the second substrate 72 may be arranged, or centered, on the first substrate 70, including the mesh layer 74, such that the first substrate 70 and mesh layer 74 include an exposed edge 75 around the perimeter on the side of the first substrate 70 coupled with the second substrate 72. The exposed edge 75 may include an equal width along the perimeter of the first substrate 70. For example, the exposed edge 75 along the sides of the first substrate 70 may be approximately 16 mm around the perimeter. However, the exposed edge 75 may include varying widths along the perimeter. It is also possible that the second substrate 72 is not centered with the first substrate 70. The exposed edge 75, including the mesh layer 74, can be electrically coupled with the door assembly 34, including the metal door plate 50 (FIG. 2) in order to ground the mesh layer 74. In some examples, the metal door plate 50 is assembled with the interior 16 and coupled with a ground wire through metal components in order to ground the mesh layer 74. For example, the metal door plate 50 may be conductively connected via the hinge assembly 58, 60.

Figure 4:
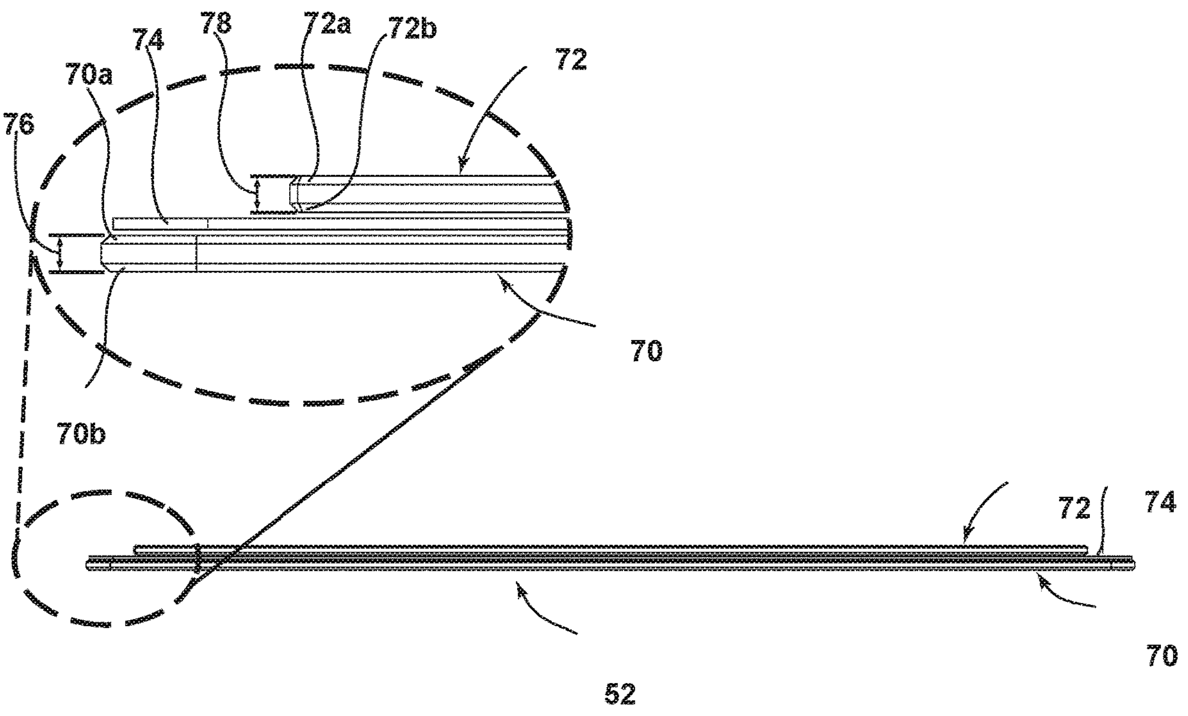
FIG. 4 is a side view of the glass assembly of FIG. 3.

FIG. 4 illustrates a side view of the laminated glass assembly 52. The first substrate 70 includes a first side **70*a* and a second side 70*b* and the second substrate 72 includes a first side 72*a* and a second side 72*b*. The mesh layer 74 may be adhered between the first side 70*a* of the first substrate 70 and the second side 72*b* of the second substrate 72 for maintaining optimal rigidity and flatness. Adhering the mesh layer 74 can include providing a foil layer on at least one side of the mesh layer 74. The foil layer may include an optical silicon glue, a transparent plastic film, or any other suitable adhesive for bonding the mesh layer 74 to the first and second substrates 70, 72**. A transparent plastic film can include, but is not limited to, a polycarbonate (PC), a polyurethane (PU), a polyvinyl butyral (PVB), Sentry-Glas® ionoplast, an ethylene-vinyl acetate (EVA), or a thermoplastic polyurethane (TPU) material.

The first sides **70*a*, 72*a*, and the second sides 70*b*, 72*b* may include chamfered edge finishes. While FIG. 4 illustrates chamfered edge finishes, any suitable edge finish may be used on the first substrate 70 and the second substrate 72, including, but not limited to, beveled edges, mitered edges, and the like. In some examples, a depth 76 of the first substrate 70 and a depth 78 of the second substrate 72 may be approximately 3.2 mm. Furthermore, the depths 76, 78 may be greater or less than 3.2 mm and can be in the range of 1-4 mm. The depths 76, 78 may be approximately equal, or may be different such that one of the first and second substrates 70, 72** is thinner or thicker than the other.

The glass assembly 52 may include superior properties for a microwave oven 10. The glass assembly 52 may be configured have sufficient strength to withstand an 8 Joule (J) mechanical impact test, or ball drop test. In some examples, the standard door impact test may include withstanding more than 3 J of impact. Therefore, the glass assembly 52 provides an increased protection from impacts. Furthermore, the glass assembly 52 can be configured to resist heat and retain its shape for 168 hours at 230 degrees Celsius. Thus, the glass assembly 52 may be considered to have high-temperature resistance. The glass assembly 52 may also be configured to have excellent thermal shock resistance, which may be measured by immersing the glass assembly 52 heated to approximately 200 degrees Celsius into ice water. The superior heat and thermal shock resistance of glass assembly 52 may be attributed to the use of optical silicon glue as the bonding substance for the mesh layer 74. Additionally, optical silicon glue may be a beneficial bonding substance as the conductivity of the silicon glue may increase the electrical connection of the mesh layer 74 and the metal door frame 44.

Figure 5:
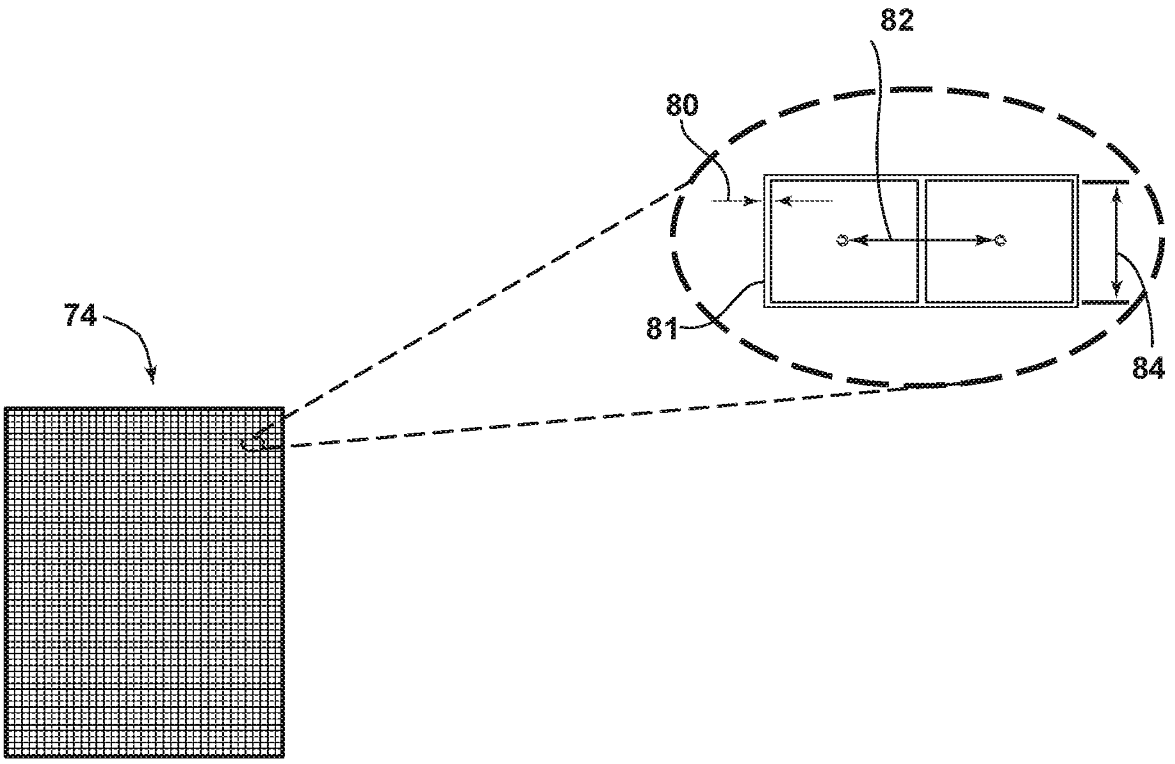
FIG. 5 is a schematic view of a portion of a mesh layer according to various aspects described herein.

Turning to FIG. 5, a schematic view of a portion of the mesh layer 74 is more clearly illustrated. The mesh layer 74 can include a plurality of wires 81 which may be woven to form the mesh layer 74. The wires 81 may be formed of any suitable electrically conductive material, such as stainless steel (e.g. 304 stainless steel), carbon steel and the like, and may include a diameter 80 in the range of 0.01-0.05 mm, and in some implementations approximately 0.02 mm. The mesh layer 74 may include openings per inch (OPI) in the range of 80-120, and in some examples approximately 100 OPI. In some implementations, the openings in the mesh layer 74 include an opening diameter 84 of approximately 0.15 mm and an opening pitch 82 of approximately 0.17 mm. In some examples, the mesh layer 74 may be blackened by a chemical conversion to reduce reflectivity in order to further increase the transparency of the glass assembly 52.

Aspects described herein may be described in any one or more of the following concepts, in combination or permutation:

A door for a microwave oven comprising a door frame having a first side and a second side, an outer glass coupled with the first side of the door frame, and a glass assembly coupled with the second side of the door frame comprising a first substantially transparent glass substrate, a second substantially transparent glass substrate, and an electrically conductive mesh layer between the first and second substantially transparent glass substrates wherein the mesh layer comprises a plurality of wires having a diameter less than 0.04 mm.

A door for a microwave oven wherein the outer glass includes a substantially transparent LCD.

A door for a microwave oven wherein the mesh layer is adhered between the first and second substantially transparent glass substrates with a foil layer comprising silicon glue.

A door for a microwave oven wherein the plurality of wires further comprise woven wires having a diameter less than 0.04 mm.

A door for a microwave oven wherein the area of the second substantially transparent glass substrate is less than the area of the first substantially transparent glass substrate and the mesh layer such that the mesh layer comprises exposed edges.

A door for a microwave oven wherein the exposed edges are in electrical communication with the door frame such that the mesh layer is grounded.

A door for a microwave oven wherein the mesh layer comprises approximately 80-120 openings per inch (OPI).

A door for a microwave oven wherein the plurality of wires are arranged to create openings having a diameter of approximately 0.15 millimeters.

A door for a microwave oven wherein the glass assembly has a transparency of greater than 70%.

A door for a microwave oven wherein the glass assembly has a thickness less than 8 millimeters.

A door for a microwave oven wherein the first and second substantially transparent glass substrates comprise tempered glass.

A door for a microwave oven wherein the glass assembly can withstand a ball drop test of at least 8 Joules of impact.

A door for a microwave oven wherein the glass assembly comprises heat resistance of 230 degrees Celsius for 168 hours.

A door for a microwave oven comprising a door frame having a first side and a second side, an outer glass including a substantially transparent LCD display coupled with the first side of the door frame, and a laminated glass assembly coupled with the second side of the door frame comprising a first substantially transparent glass substrate, a second substantially transparent glass substrate, and an electrically conductive mesh layer adhered between the first and second substantially transparent glass substrates wherein the mesh layer comprises a plurality of woven wires having a diameter less than 0.04 mm.

A door for a microwave oven wherein the mesh layer is adhered with a foil layer comprising a conductive silicone glue.

A door for a microwave oven wherein the area of the second substantially transparent glass substrate is less than the area of the first substantially transparent glass substrate and the mesh layer such that the mesh layer comprises exposed edges.

A door for a microwave oven wherein the exposed edges are in electrical communication with the door frame such that the mesh layer is grounded.

A door for a microwave oven wherein the mesh layer comprises approximately 80-120 openings per inch (OPI).

A door for a microwave oven wherein the plurality of wires are arranged to create openings having a diameter of approximately 0.15 millimeters.

A door for a microwave oven wherein the glass assembly has a transparency of greater than 70%.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A door for a microwave oven comprising:
a door frame having a first side and a second side;
an outer glass coupled with the first side of the door frame, the outer glass including a substantially transparent LCD display that is configured to include a light transmissivity in the visible spectrum of at least 70%; and
a glass assembly coupled with the second side of the door frame comprising:
a first substantially transparent glass substrate comprising a first area measurement;
a second substantially transparent glass substrate comprising a second area measurement that is less than the first area measurement of the first substantially transparent glass substrate; and
an electrically conductive mesh layer between the first and second substantially transparent glass substrates and including dimensions larger than the second area measurement such that the mesh layer comprises an exposed perimeter surface on a side of the first substrate that is adjacent the second substrate, wherein the mesh layer comprises a plurality of wires having a diameter less than 0.04 mm and the mesh layer comprises approximately 80-120 openings per linear inch (OPI); and wherein the electrically conductive mesh layer is bonded to the first substantially transparent glass substrate and the second substantially transparent glass substrate by a foil layer comprising a conductive silicon glue, and wherein the silicon glue conductively bonds the electrically conductive mesh layer to the to the door frame.

2. The door for a microwave oven according to claim 1, wherein the exposed perimeter surface of the mesh layer is in electrical communication with the door frame such that the mesh layer is grounded.

3. The door for a microwave oven according to claim 1, wherein the plurality of wires are arranged to create openings having a diameter of approximately 0.15 millimeters.

4. The door for a microwave oven according to claim 3, wherein the openings in the mesh layer include an opening pitch of approximately 0.17 mm.

5. The door for a microwave oven according to claim 1, wherein the exposed edges are electrically coupled with a metal door plate.

6. The door for a microwave oven according to claim 1, wherein the glass assembly has a transparency of greater than 70%.

7. The door for a microwave oven according to claim 1, wherein the glass assembly has a thickness less than 8 millimeters.

8. The door for a microwave oven according to claim 1, wherein the first and second substantially transparent glass substrates comprise tempered glass.

9. The door for a microwave oven according to claim 1, wherein the second substantially transparent glass substrate is centered on the first substantially transparent glass substrate.

10. The door for a microwave oven according to claim 9, wherein the exposed perimeter surface of the mesh layer includes an approximately equal width along the perimeter of the first substantially transparent glass substrate.

11. The door for a microwave oven according to claim 1, wherein a width of the exposed perimeter surface of the mesh layer is greater than a depth of either of the first and second substantially transparent substrates.

12. A door assembly for a microwave oven comprising:
a door frame having a first side and a second side;
an outer glass including a substantially transparent LCD display coupled with the first side of the door frame, wherein the substantially transparent LCD is configured to include a light transmissivity in the visible spectrum of at least 70%; and
a laminated glass assembly coupled with the second side of the door frame comprising:
a first substantially transparent glass substrate comprising a first depth;
a second substantially transparent glass substrate comprising a second depth; and
an electrically conductive mesh layer adhered between the first and second substantially transparent glass substrates and including dimensions larger than the second substantially transparent glass substrate such that the mesh layer comprises an exposed perimeter surface that includes a width larger than either one of the first and second depths, wherein the mesh layer comprises a plurality of woven wires having a diameter less than 0.04 mm and the mesh layer comprises approximately 80-120 openings per linear inch (OPI); and wherein the electrically conductive mesh layer is bonded to the first substantially transparent glass substrate and the second substantially transparent glass substrate by a foil layer comprising a conductive silicon glue, and wherein the silicon glue conductively bonds the electrically conductive mesh layer to the to the door frame.

13. The door assembly for a microwave oven according to claim 12, wherein a second area of the second substantially transparent glass substrate is less than a first area of the first substantially transparent glass substrate.

14. The door assembly for a microwave oven according to claim 13, wherein the exposed edges are in electrical communication with the door frame such that the mesh layer is grounded.

15. The door assembly for a microwave oven according to claim 14, wherein the exposed perimeter surface is electrically coupled with a metal door plate.

16. The door assembly for a microwave oven according to claim 12, wherein the glass assembly has a thickness less than 8 millimeters.

17. The door assembly for a microwave oven according to claim 16, wherein the width of the exposed perimeter surface is larger than the thickness of the glass assembly.

18. The door assembly for a microwave oven according to claim 12, wherein the mesh layer is blackened.

19. A door for a microwave oven comprising:
a door frame having a first side and a second side;
an outer glass including a substantially transparent LCD display coupled with the first side of the door frame, wherein the substantially transparent LCD is configured such that a user can view an interior of the microwave oven therethrough; and a laminated glass assembly coupled with the second side of the door frame comprising:

a first substantially transparent glass substrate comprising a first area measurement;

a second substantially transparent glass substrate comprising a second area measurement that is less than the first area measurement of the first substantially transparent glass substrate; and an electrically conductive mesh layer adhered between the first and second substantially transparent glass substrates and including dimensions larger than the second area measurement such that the mesh layer comprises an exposed perimeter surface on a side of the first substrate that is adjacent the second substrate, wherein the mesh layer comprises a plurality of woven wires having a diameter in a range of 0.01-0.05 mm and the mesh layer comprises approximately 80-120 openings per linear inch (OPI); and wherein the electrically conductive mesh layer is bonded to the first substantially transparent glass substrate and the second substantially transparent glass substrate by a foil layer comprising a conductive silicon glue, and wherein the silicon glue conductively bonds the electrically conductive mesh layer to the to the door frame.

20. The door for a microwave oven according to claim 19, wherein the substantially transparent LCD includes a light transmissivity in the visible spectrum of at least 70%.

* * * * *